US012793717B2

(12) United States Patent
González Torre et al.

(10) Patent No.: US 12,793,717 B2
(45) Date of Patent: Nov. 10, 2026

(54) METHOD AND PROCESS FOR SPEAKER LABELING OF AUDIO CONTENT USING SEGMENTATION AND PRUNING

(71) Applicant: Oracle International Corporation, Redwood Shores, CA (US)

(72) Inventors: Ivan González Torre, Vitoria-Gasteiz (ES); Nancy Bertin, Acigné (FR); Ewen Camberlein, Saint Gondran (FR); Rémi Quang-Khanh-Ngoc Duong, Rennes (FR); Nathan Souviraa Labastie, Rennes (FR)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 18/652,648

(22) Filed: May 1, 2024

(65) Prior Publication Data

US 2025/0342840 A1 Nov. 6, 2025

(51) Int. Cl.

| | |
|---|---|
| ***G10L 17/02*** | (2013.01) |
| ***G06F 16/65*** | (2019.01) |
| ***G10L 15/26*** | (2006.01) |
| ***G10L 25/78*** | (2013.01) |

(52) U.S. Cl.

CPC .............. *G10L 17/02* (2013.01); *G06F 16/65* (2019.01); *G10L 15/26* (2013.01); *G10L 25/78* (2013.01)

(58) Field of Classification Search

CPC ................................ G10L 17/02; G06F 16/65

See application file for complete search history.

(56) References Cited

U.S. PATENT DOCUMENTS

| | | | | |
|---|---|---|---|---|
| 6,289,304 | B1 * | 9/2001 | Grefenstette | G06F 16/345 715/236 |
| 7,908,279 | B1 * | 3/2011 | Thirumalai | G06F 40/194 707/750 |
| 10,699,706 | B1 * | 6/2020 | Jayavel | G10L 15/22 |

(Continued)

FOREIGN PATENT DOCUMENTS

| | | |
|---|---|---|
| JP | 2022-180258 A | 12/2022 |
| WO | 2023/234942 A1 | 12/2023 |

OTHER PUBLICATIONS

"Turn-to-Diarize: Online speaker diarization constrained by transformer transducer speaker turn detection", Mar. 19, 2024, pp. 12.

(Continued)

*Primary Examiner* — Shaun Roberts

(74) *Attorney, Agent, or Firm* — Invoke

(57) ABSTRACT

Techniques for diarization using embedding pruning are disclosed. A set of audio content segments and their associated tokens are accessed by a speaker enumeration module of a speech processing engine. The speaker enumeration module uses various pruning criteria to prune audio content segments from the set to result in a pruned set of audio content segments. The pruned set of audio content segments is analyzed using a clustering process to determine a number of speakers. The number of speakers is used in a second clustering process to identify speakers in the original set of audio content segments prior to pruning. A transcription of the original audio content with speaker labels is generated using the number of speakers identified for the pruned set of audio content segments.

20 Claims, 5 Drawing Sheets

(56) References Cited

U.S. PATENT DOCUMENTS

| | | | | |
|---|---|---|---|---|
| 11,138,334 | B1 * | 10/2021 | Garrod | G10L 15/02 |
| 2002/0078096 | A1 * | 6/2002 | Milton | G06F 16/345 715/252 |
| 2003/0023430 | A1 * | 1/2003 | Wang | G10L 25/78 704/226 |
| 2004/0122666 | A1 * | 6/2004 | Ahlenius | G10L 15/22 704/E15.04 |
| 2007/0067157 | A1 * | 3/2007 | Kaku | G06F 40/289 704/10 |
| 2008/0270374 | A1 * | 10/2008 | Li | G06F 16/24558 707/999.005 |
| 2013/0297634 | A1 * | 11/2013 | Shami | G06F 40/295 707/758 |
| 2014/0029757 | A1 * | 1/2014 | Aronowitz | G10L 17/00 381/59 |
| 2014/0074467 | A1 * | 3/2014 | Ziv | G10L 25/51 704/235 |
| 2015/0293903 | A1 * | 10/2015 | Baron | G06F 40/30 704/9 |
| 2016/0379627 | A1 * | 12/2016 | Yassa | G10L 25/78 704/255 |
| 2018/0365323 | A1 * | 12/2018 | Doornenbal | G06F 16/9535 |
| 2019/0156832 | A1 * | 5/2019 | Church | G10L 15/26 |
| 2020/0152207 | A1 * | 5/2020 | Wang | G10L 17/04 |
| 2021/0174790 | A1 * | 6/2021 | Nishiyama | G10L 15/1822 |
| 2021/0303619 | A1 * | 9/2021 | Boothalingam | G06F 16/65 |
| 2022/0139418 | A1 * | 5/2022 | Aida | H04M 3/5175 704/233 |
| 2022/0375492 | A1 * | 11/2022 | Grangier | G10L 25/78 |
| 2023/0089308 | A1 | 3/2023 | Wang et al. | |
| 2023/0169981 | A1 | 6/2023 | Kim et al. | |
| 2023/0215417 | A1 * | 7/2023 | Mirzoyan | G06F 40/268 704/260 |
| 2024/0331693 | A1 * | 10/2024 | Ito | H04N 23/60 |
| 2024/0347064 | A1 * | 10/2024 | Li | G06N 3/045 |
| 2025/0077769 | A1 * | 3/2025 | Sundaram | G06F 40/216 |

OTHER PUBLICATIONS

Cui et al., “Improving Speaker Assignment in Speaker-Attributed ASR for Real Meeting Applications”, Mar. 11, 2024, pp. 8.

Fan et al., “Token-level Speaker Change Detection Using Speaker Difference and Speech Content via Continuous Integrate-and-fire”, Nov. 17, 2022, pp. 3.

Kanda et al., “A Comparative Study of Modular and Joint Approaches for Speaker-Attributed ASR on Monaural Long-Form Audio”, Sep. 17, 2021, pp. 8.

Kanda et al., “Streaming Speaker-Attributed ASR with Token-Level Speaker Embeddings”, Jul. 14, 2022, pp. 3.

Li et al., “Improving Speaker Segmentation via Speaker Identification and Text Segmentation”, Sep. 6-10, 2009, pp. 904-907.

Liu et al., “PME: pruning-based multi-size embedding for recommender systems”, Front. Big Data, Jun. 15, 2023, vol. 6, pp. 16.

Timofeeva et al., “Improving Speaker Assignment in Speaker-Attributed ASR for Real Meeting Applications”, Speech and Computer: 23rd International Conference, SPECOM 2021, Sep. 27-30, 2021, pp. 692-703.

Wu et al., “Speaker Change Detection For Transformer Transducer ASR”, 2023 IEEE International Conference on Acoustics, Speech and Signal Processing, Jun. 2023, pp. 3.

* cited by examiner

METHOD AND PROCESS FOR SPEAKER LABELING OF AUDIO CONTENT USING SEGMENTATION AND PRUNING

TECHNICAL FIELD

The present disclosure relates to the field of digital audio processing. In particular, the present disclosure relates to processing speech or other digital audio content using segmentation and pruning, such as to determine a number of speakers in speech content and/or a number of sources in other audio content and/or to group the content by speaker and/or source. Such techniques may facilitate, for example, labeling audio content with respective source or speaker identifiers.

BACKGROUND

Speech recognition, also known as automatic speech recognition (ASR) or speech-to-text (STT), is the process of converting spoken language into text. This technology enables computers to understand and interpret human speech, making it possible to interact with devices using voice commands, transcribe spoken words into text documents, or enable features like voice search and virtual assistants. Speech recognition systems typically involve processing audio signals, analyzing the acoustic features of speech, and applying language models and algorithms to convert the audio input into text output.

Diarization is the process of partitioning an audio stream into segments corresponding to individual speakers, often referred to as speaker segmentation, and then labeling or identifying the segments with the appropriate speaker identifiers corresponding to known or unknown speakers. Diarization is a crucial component in tasks involving multi-speaker audio, such as transcribing meetings, conversations, or broadcast news. It helps distinguish between speakers, enabling downstream tasks like speaker-dependent speech recognition or speaker-based analytics. Diarization systems typically utilize techniques such as pre-processing, speaker embeddings, clustering algorithms, and some optional post-processing to accurately segment and label speakers in audio data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
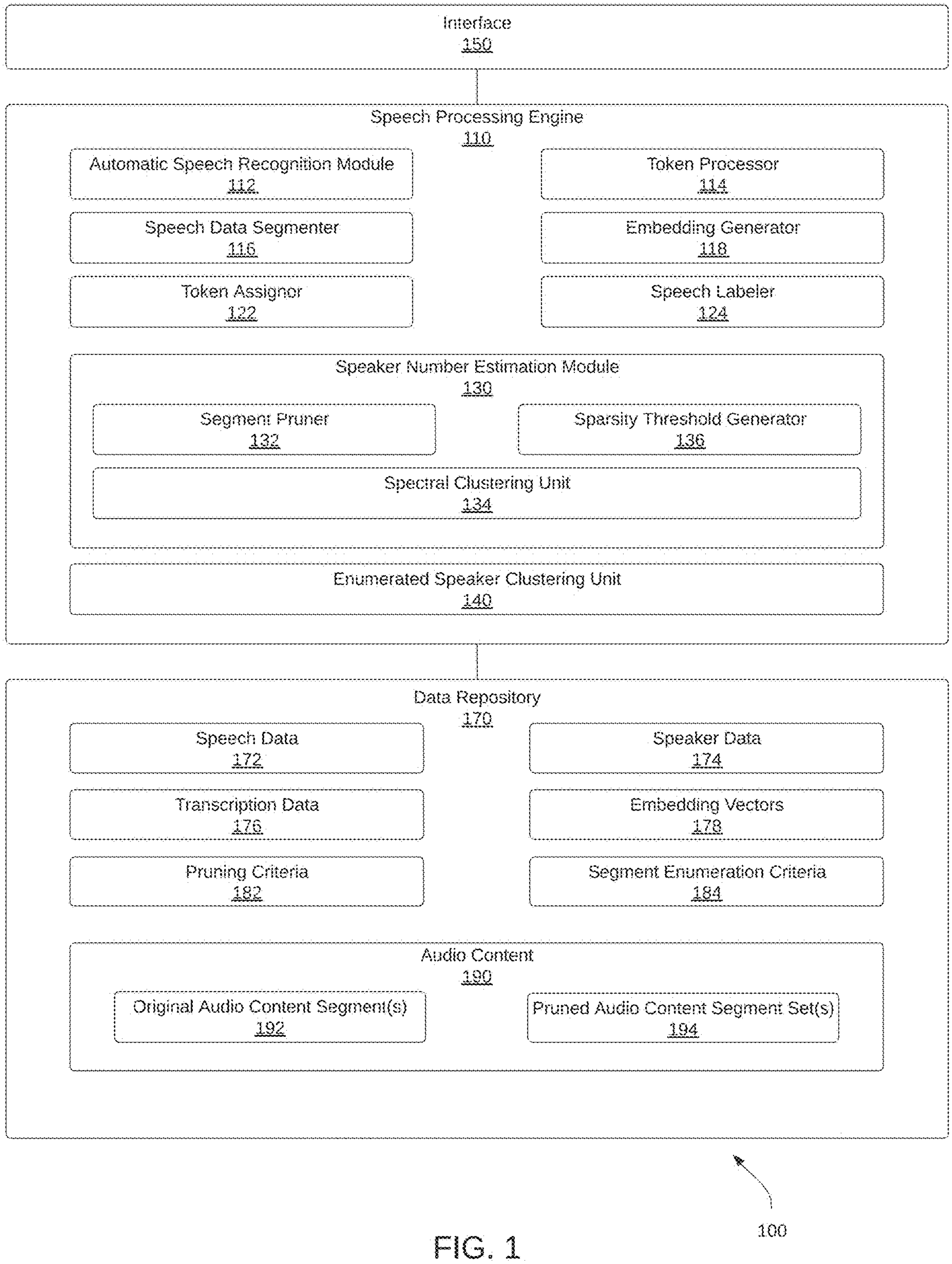
FIG. 1 illustrates an embedding pruning-based diarization architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DIARIZATION USING EMBEDDING PRUNING SYSTEM ARCHITECTURE
3. OPERATIONS FOR DIARIZATION USING EMBEDDING PRUNING
4. EXAMPLE DIARIZATION USING EMBEDDING PRUNING
5. COMPUTER NETWORKS AND CLOUD NETWORKS
6. MICROSERVICE APPLICATIONS
7. HARDWARE OVERVIEW
8. MISCELLANEOUS; EXTENSIONS

1. GENERAL OVERVIEW

Diarization and automatic speech recognition (ASR) are integral components of speech processing systems. The presence of variations in speech patterns, accents, languages, speaking rates, background noise, overlapping speech, and/or other sounds can cause inaccuracies in different processing steps for both diarization and ASR systems. Concerning diarization, the ability to accurately estimate the number of speakers is helpful for speaker clustering, and thus the overall diarization performance. Furthermore, if a diarization algorithm fails to correctly identify the number of speakers, associated ASR and diarization systems using the algorithm will have resulting errors in assigning speaker labels to transcription.

One or more embodiments selectively prune audio content embeddings for the estimation of the number of speakers. Pruning embeddings may reduce the risk of misestimating the number of speakers present in audio data. Embeddings that could otherwise contribute to errors in the estimation are pruned from the set of embeddings computed from the audio content, leading to a more accurate and robust identification of the number of speakers present in an audio recording. Embedding pruning can be applied to technical problems that arise in the field of diarization to account for situations in which certain types of embeddings could otherwise contribute to diarization errors when determining the number of speakers in audio data.

Various embodiments also include systems, methods, non-transitory computer readable media, and/or other media for executing the operations. Various embodiments described further in this Specification and/or recited in the claims may or may not be included in this General Overview section.

2. EMBEDDING PRUNING-BASED DIARIZATION ARCHITECTURE

An ASR system includes technology that automatically converts spoken language into written text. ASR systems work by analyzing audio data input, typically in the form of spoken words or phrases that are recorded and/or stored in a digital audio format, and then using algorithms to transcribe that speech into text. ASR systems are used in many different applications.

Speaker-attributed ASR systems include segmenting input audio into distinct segments corresponding to one or more speakers for text transcription. Such systems have diarization components associating the speaker(s) who produced specific segment(s) of speech with those specific segments, helping the ASR system to transcribe speech accurately by speaker.

FIG. 1 illustrates an architecture for an embedding pruning-based diarization system 100 in accordance with one or more embodiments. As illustrated in FIG. 1, system 100 includes a speech processing engine 110, an interface 150, and a data repository 170. The speech processing engine 110 is in electrical communication with the interface 150 and the data repository 170, such as by being connected via a local or networked connection.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

In FIG. 1, the speech processing engine 110 includes an automatic speech recognition (ASR) module 112, a token processor 114, a speech data segmenter 116, an embedding generator 118, a token assignor 122, a speech labeler 124, a speaker number estimation module 130, and an enumerated speaker clustering unit 140.

The ASR module 112 is configured to perform various operations for processing spoken language. The ASR module 112 includes a selection from various suitable ASR models, including approaches with a statistical acoustic model and a language model, as well as approaches based on convolutional neural networks (CNNs), recurrent neural networks (RNNs), long short-term memory (LSTM) architectures, transformer-based architectures, or other deep learning frameworks. The ASR module 112 performs operations related to ASR that encompass multiple stages, including acoustic modeling, encoding, and/or decoding language. Acoustic models establish the relationship between acoustic features of speech signals (such as Mel-frequency cepstral coefficients [MFCCs]) and phonemes (sub-word units) to identify the most probable sequence for input audio. Language modeling predicts the likelihood of word sequences in a given language, assisting in identifying the most probable sequence of words for input audio. Decoders decode combined information from acoustic and language models to find the most probable word sequence matching the input audio, utilizing techniques like beam search or dynamic programming. The ASR module 112 assigns a confidence score to encodings or decoded tokens, such as by assigning a confidence value to a token assignment. The ASR module 112 also assigns timestamps (i.e., start times, end times) to the decoded tokens.

The token processor 114 includes modules for processing and/or dividing audio input or audio segments into smaller units called tokens. The choice of tokens depends on the task and language. For instance, word tokenization breaks text into individual words; sub-word tokenization breaks words into smaller sub-word units; and character tokenization breaks text into individual characters. The token processor 114 also includes modules for tasks like lowercasing, punctuation removal, and special character handling. In some cases, input audio is tokenized using a tokenization library that provides a dictionary or set of tokens, such as "NLTK," "spaCy," and/or Hugging Face's "Transformers."

The speech data segmenter 116 partitions continuous audio input into smaller segments. It includes modules for segmentation operations, such as duration-based segmentation, pause-based segmentation (breaking speech at pauses between words or sentences), or energy-based segmentation (dividing speech based on changes in the amplitude of sound waves). The segmenter 116 uses delimiters or algorithms, such as dynamic programming, Hidden Markov Models (HMMs), or neural network-based approaches, to partition input audio into segments.

The embedding generator 118 includes modules for performing operations that transform input audio data into dense, lower-dimensional vectors known as embeddings. These embeddings capture semantic or contextual information about the input audio data, enabling more efficient processing and analysis. The modules within the embedding generator 118 are responsible for performing various operations to extract meaningful features from the input audio data. These operations may include various techniques, such as feature extraction, dimensionality reduction, and neural network-based encoding. Through these operations, the generator captures essential aspects of the audio content relevant for a particular task, such as determining speaker characteristics, phonetic content, prosody, and semantic meaning.

The resulting embeddings are typically vectors with lower dimensions compared to the original audio data, making them more compact (more densely populated) and computationally more efficient to work with. Despite their reduced dimensionality, such embeddings preserve relevant, discriminative information that is essential for downstream tasks such as speech recognition, speaker diarization, emotion recognition, and content analysis.

The token assignor 122 includes modules for performing operations that assign specific tokens or labels to segments of text or speech data. The token assignor 122 assigns tokens to audio data or segments of audio data. The token assignor assigns the tokens to the segments by assigning a decoded token to a segment of the audio data based on the timestamp of the decoded token being temporally between a start time and end time of the segment. The token assignor 122 includes assignments of word tokens, sub-word tokens, phonetic tokens, grapheme tokens, word piece tokens, and/or contextual tokens to audio data, audio data segments, and/or portions of audio data segments. In the disclosed invention, the token assignor allows tokens to be assigned to audio segments resulting from the speech data segmenter 116.

The speech labeler 124 includes modules that perform operations related to annotating, tagging, or labeling audio data or audio data segments. The labels can include a descriptor of a speaker identity of the segment, topical content of the segment, tone or sentiment of the segment, or other attributes of the speech. Labeled speech can include assignments of speaker identities to a specified number of speakers specified by the speaker number estimation module 130.

In FIG. 1, the speaker number estimation module 130 includes a segment pruner 132, a spectral clustering unit 134, and a sparsity threshold generator 136. Speaker number estimations include a number of speakers predicted after embedding pruning. Speaker number estimation determines how many speakers are present by grouping speech audio segments (each one corresponding to a different speaker) and counting the resulting number of groups, without necessarily identifying the speakers. In various embodiments, components of the speech processing engine 110 provide a set of audio content segments to the speaker number estimation module 130. As used herein in reference to various embodiments, audio content segments refer to segments of speech recordings and/or embeddings that are generated from speech recordings or other audio content.

The segment pruner 132 includes modules that prune segments from a set of audio content segments based on one or more pruning criteria. The set of segments includes a first set of segments that undergoes a pruning operation using particular criteria. A pruned set of segments resulting from pruning consists of the segments remaining from the first set of segments after segments meeting the pruning criteria are removed from the first set of segments. For example, the segment pruner 132 produces a pruned set of segments for which corresponding embeddings meet a minimum number of tokens threshold, while pruning or leaving out one or more segments from the original set segments based on corresponding embeddings for the one or more segments not meeting the minimum number of tokens threshold.

The spectral clustering unit 134 is a unit or module responsible for performing spectral clustering operations on a set of embedding vectors, such as on the set of remaining embeddings after pruning from the segment pruner 132. Spectral clustering is a method used in machine learning and data analysis for clustering data points based on their similarity. Spectral clustering leverages spectral properties of a similarity matrix of data points to group them into clusters. The spectral clustering unit 134 partitions embeddings corresponding to audio segments into clusters using types of similarity.

The spectral clustering unit 134 generates a similarity matrix that represents the pairwise similarity between audio content segments. Common measures of similarity include Euclidean distance, cosine similarity, or a Gaussian kernel function. The similarity matrix is then used to construct a graph. In the graph, data points are nodes, and the similarity between nodes determines the edge weights. This similarity graph can be represented as an adjacency matrix. Next, the Laplacian matrix of the graph is computed. The Laplacian matrix captures the graph's structural information. By performing eigenvalue decomposition on this matrix, a set of eigenvectors and corresponding eigenvalues is obtained. An estimation of a number of speakers is obtained by determining the number of clusters corresponding to a maximum eigengap for which the difference between the consecutive eigenvalues is a maximum. By identifying the largest gap (eigengap) between eigenvalues, an optimal number of clusters in the data is determined. By analyzing the maximum eigengap, the spectral clustering unit 134 can estimate a number of distinct speakers in set of audio content segments.

In embodiments, the clusters identified by the spectral clustering unit 134 are enumerated to identify a number of speakers based on the number of clusters. The enumeration need not name or label the speakers or clusters explicitly but does provide a number of speakers based on a number of clusters.

The sparsity threshold generator 136 is a unit or module that performs operations for generating sparsity thresholds p. Such values are similarity thresholds, expressed as an absolute threshold or a proportion, determining whether two embeddings are connected or not in the similarity graph built from the embedding affinity matrix that will be used by the spectral clustering algorithm.

For example, if the sparsity threshold $p=0.5$, then 50% of the values in each row of the affinity matrix will be zeroed. In this example, the sparsity threshold p is a parameter computed by the sparsity threshold p generator. In the example, a sparsity threshold p can be obtained by grid search on a development set (e.g., a set of representative synthetic data used for development purposes) using speech audio segment lengths of three seconds (3s).

The data repository 170 encompasses various types of data for speech processing tasks. This includes speech data 172 that contain recordings of spoken language, speaker data 174 that provide information about individual speakers, transcription data 176 that represent textual renditions of speech content, embedding vectors 178 that numerically represent speech characteristics, pruning criteria 182 that determine the embeddings that are discarded from a spectral clustering process, segment enumeration criteria 184 that determine or delimit segments of speech data, and audio content 190 that include audio recordings and segments to be transcribed.

Speech data 172 refers to recorded audio data containing spoken language. This could include recordings of conversations, speeches, interviews, phone calls, or any other form of spoken communication. The speech data includes raw audio containing speech and/or audio data that has been processed to extract speech data. Speech data can be captured using different recording devices, such as microphones, telephones, or audio recorders; the speech data can be stored in various audio data file formats.

Speaker data 174 refers to information about individual speakers or known speakers in a dataset. Speaker data includes numerous attributes, such as speaker identities, demographic information (e.g., age, gender), speaker-specific characteristics (e.g., accent), and/or other metadata associated with a speaker in the speech data. These attributes help analyze and categorize speakers within speech data. Speaker data 174 includes data about known and unknown speakers. A set of attributes is associated with an unknown speaker regardless of whether the identity of the speaker is known.

Transcription data 176 consists of the textual representation of the spoken content in speech data. Transcriptions are created from audio content by converting spoken words in the audio content into written text. Transcription data 176 includes transcriptions of audio data files and/or segments that facilitate text-based analysis, indexing, and retrieval of spoken content for various applications. Transcripts include digital or physical text-based formats.

Embedding vectors 178 are numerical representations of data points in a n-dimensional space. In the context of speech processing, embedding vectors may represent various aspects of speech signals, such as phonetic content, speaker characteristics, or semantic meaning. Different types of embedding vectors can be used in different tasks such as clustering, speaker recognition, speech recognition, speech synthesis, labeling, and other tasks. Recorded speech audio is segmented into audio content segments. In various embodiments discussed herein, the segmentation process includes various processing steps such as: non-speech segment removal via speech activity detection, zero-padding (if a segment's duration is less than a pre-defined length), truncating a long segment into (overlapping or not overlapping) fixed length segments, etc. Embeddings are computed for the audio content segments. In an example, an audio content segment is a three-second (3s) portion of recorded speech. The audio content segment is assigned zero or more tokens. In the case that no tokens are assigned to a segment, the audio content segment is designated a silent segment that may or may not be represented by an embedding.

Pruning criteria 182 refers to rules or conditions used to selectively remove or filter out certain audio data segments. In the context of diarization using embedding pruning, the pruning criteria 182 refers to criteria used to determine the audio segments to prune from a set of audio segments before spectral clustering is applied to the audio segments. By eliminating segments that could otherwise contribute to error before performing spectral clustering, speaker overestimation is eliminated or reduced, improving diarization. The pruning criteria include a criterion for pruning based on the number of tokens in a segment. The pruning criteria include a criterion for pruning based on a confidence score received from an ASR module representing a confidence value for a segment, such as a confidence value for the accuracy of the tokens identified in the audio segment. The pruning criteria includes a criterion for pruning based on an audio content segment, including silence and/or overlapping speech.

Segment enumeration criteria 184 specify the rules or conditions used to identify and enumerate segments or portions of audio or speech data. Segment enumeration criteria 184 include criteria based on elapsed time, acoustic properties (e.g., energy level, duration of a sound), linguistic features (e.g., pauses, speaker changes), and/or other characteristics relevant to the segmentation task. Segment enumeration criteria are used in speaker diarization using embedding pruning to segment audio data for clustering. In various embodiments, the segment enumeration criteria include algorithms for detecting discrete audio content items and for determining segments from an audio file based on the content items. In other embodiments, audio data is divided into equal-length segments of a specified temporal duration.

Audio content 190 refers to one or more original audio content segments 192 and one or more pruned audio content segment sets 194. Generally, the audio content segments refer to one or more sets of one or more audio content segments. As used herein, an audio content segment includes raw audio content and/or embedding of audio content. Thus, the term audio content segment may refer to an embedding for a particular portion of digital audio data. The pruned audio content segment sets 194 include one or more sets of audio content segments that have been pruned relative to one or more audio content segment sets 192, such as by having one or more audio content segments removed from a first set of audio content segments to define a pruned set of audio content segments.

In one or more embodiments, the data repository 170 is any type of storage unit and/or device (e.g., a file system, database, collection of tables, or any other storage mechanism) for storing data. Further, a data repository 170 may include multiple different storage units and/or devices. The multiple different storage units and/or devices may or may not be of the same type or located at the same physical site. Further, a data repository 170 may be implemented or executed on the same computing system as speech processing engine 110. Additionally, or alternatively, a data repository 170 may be implemented or executed on a computing system separate from speech processing engine 110. The data repository 170 may be communicatively coupled to speech processing engine 110 via a direct connection or via a network.

Information describing diarization using embedding pruning may be implemented across any of components within the system 100. However, this information is illustrated within the data repository 170 for purposes of clarity and explanation.

Additional embodiments and/or examples relating to computer networks are described below in Section 4, titled "Computer Networks and Cloud Networks."

In one or more embodiments, diarization using embedding pruning refers to hardware and/or software configured to perform operations described herein for diarizing speech contained in audio data. Examples of operations for diarizing audio data using embedding pruning are described below with reference to FIG. 2.

Diarization using embedding pruning is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 150 refers to hardware and/or software configured to facilitate communications between a user and speech processing engine 110. Interface 150 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 150 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 150 is specified in one or more other languages, such as Java, C, or C++.

3. OPERATIONS FOR DIARIZATION USING EMBEDDING PRUNING

Figure 2:
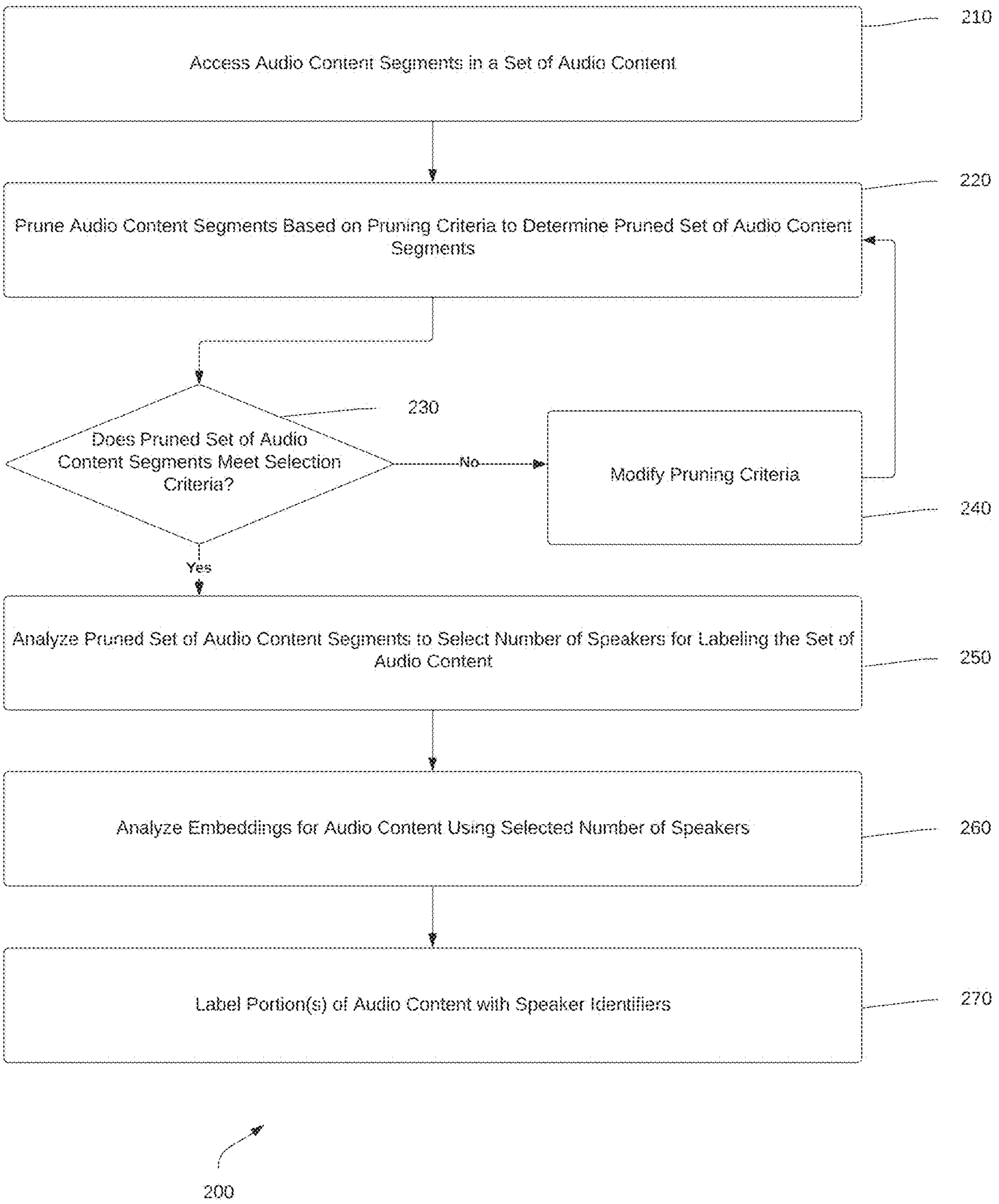
FIG. 2 illustrates an example set of operations for diarization using embedding pruning in accordance with one or more embodiments.

FIG. 2 illustrates an example set of operations 200 for diarization using embedding pruning in accordance with one or more embodiments. In embodiments, Operations 200 are performed by a speech processing engine such as speech processing engine 110 of FIG. 1. One or more operations illustrated in FIG. 2 may be modified, rearranged, or omitted. Accordingly, the sequence of operations illustrated in FIG. 2 should not be construed as limiting the scope of one or more embodiments.

As illustrated in FIG. 2, the system accesses audio content segments from a set of audio content (Operation 210). The system accesses audio data from a data repository or other data source. The system accesses segments of data in the audio data that contain intelligible speech. For example, a speech processing engine receives a digital audio file. The speech processing engine segments the audio content from the digital audio file to generate the set of audio content segments. The speech processing engine segments the audio content using any known or to be developed techniques. The speech processing engine segments the audio content use techniques that are used for diarization. Alternatively, or additionally, the engine accesses audio data that has already been segmented into a set of audio content segments.

Next, the system prunes audio content segments based on one or more pruning criteria to determine a pruned set of audio content segments (Operation 220). Various pruning criteria are applied to prune audio content segments from the set of audio content segments to improve overall accuracy of speaker estimation. A segment pruner of a speaker number estimation module of the speech processing engine evaluates the one or more pruning criteria to the set of audio content segments to determine a pruned set of audio content segments. For example, the speaker number estimation module evaluates a token count, a percentage of silence, a speaker change, and/or a percentage of overlapped speech for an audio content segment and, if the token count is too low or the percentage of silence or overlapped speech is too high, the audio content segment is pruned.

In embodiments, the speaker number estimation module 130 determines a number of tokens assigned to an audio content segment. If the number of tokens is too low, the audio content segment is pruned and is not included in the pruned set of audio content segments. In another example, the speaker number estimation module determines a ratio of speech to silence in a particular audio content segment. In response to the ratio of speech to silence being too low, speaker number estimation module prunes the particular audio content segment from the set of audio content segments. In other examples, the speaker number estimation module prunes a particular audio content segment after determining one or more of the following: a confidence score from an ASR module for the particular audio content segment is too low; a ratio of overlapped speech to total speech in the particular audio content segment is too high; a lexical correlation value (an aggregate correlation percentage or score determined by a language model evaluation of tokens assigned to a segment) in the particular audio content segment is too low; that the particular audio content segment is a member of a minority cluster or has a low neighbor density; and/or that another pruning criteria is met.

The system determines if the pruned set of audio content segments meets one or more selection criteria (Operation 230). For example, the system counts the number of audio content segments in the pruned set of audio content segments and/or the number of speakers identified in the audio content segments and compares the number of audio content segments and/or the identified number of speakers to a threshold number. If too few segments are identified, the pruning criteria are adjusted in a direction to create more lenient pruning. For example, if zero segments are identified, or less than half of the number of segments in the initial set of audio content segments for the initial audio data are identified (or another threshold number), the pruning criteria are adjusted to be less strict. For example, a token count threshold is reduced, a percentage silence threshold is increased (to allow segments with relatively more silence), and/or a percentage overlapped speech threshold is increased (to allow segments with relatively more overlapped speech). Using the example of a token number threshold as pruning criteria, if the selection criteria is not met (i.e., there are not enough segments selected), the token number threshold is reduced. If a first token number threshold x is reduced to a token number threshold y, segments having at least y tokens but less than x tokens will not be pruned from a second pruned set of audio content segments after adjusting the pruning criteria in this way despite having been pruned from the first pruned set of audio content segments.

As another example, the system counts the number of audio content segments in the pruned set of audio content segments and/or the identified number of speakers and compares the number of audio content segments and/or the identified number of speakers to a specified threshold number. If too many segments are identified, the pruning criteria are adjusted in a direction to create stricter pruning. For example, if all the segments are identified, or more than half of the number of segments in the initial set of audio content segments for the initial audio data are identified (or another threshold number), the pruning criteria are adjusted to be stricter.

In the case that the pruned set of audio content segments does not meet the selection criteria, the system modifies the one or more pruning criteria (Operation 240). Using the example of a token number threshold as pruning criteria, if the selection criteria is not met (i.e., there too many segments selected), the token number threshold can be reduced. If a first token number threshold x is increased to a token number threshold y, segments having at least x tokens but less than y tokens will be pruned from a second pruned set of audio content segments after adjusting the pruning criteria despite not being pruned from the first pruned set of audio content segments.

In the example, tokens are received by a speaker number estimation module from an ASR module 112 or other component of a speech processing engine such as speech processing engine 110 of FIG. 1. Embeddings of audio segments are received by the speaker number estimation module. Any number of tokens are assigned to the embeddings based on timestamps. Therefore, one embedding could contain one or multiple tokens, but a unique token appears in one embedding. Embeddings are removed from the embedding set received by the speaker number estimation module. The embeddings that contain N or fewer tokens, where N=1,2,3 . . . are removed, starting with a selected N (for example, with N>0). The remaining embeddings, after the embeddings with N or fewer tokens are pruned, are counted, and if the number of embeddings is less than L, then pruning occurs again with a new value for N:N*=N-1. This step is recursively performed until (a) the number of embeddings is greater than the selection criteria L, or (b) no pruning is applied in the previous step (e.g., N*=0).

In the case that the pruned set of audio content segments associated with the remaining embeddings does meet the selection criteria, the system analyzes the pruned set of audio content segments to estimate a number of speakers for labeling the set of audio content (Operation 250). The system applies techniques that group the segments by likeness of associated embeddings. Various techniques, such as spectral clustering, k-means clustering, or other clustering algorithms, are used to define groups or clusters according to properties of the audio content segments. For example, spectral clustering is used to determine a number of significant clusters existing in the pruned set of audio content segments.

Spectral clustering is used to partition the pruned set of audio content segments into groups based on similarities derived from the eigenvectors of a graph whose Laplacian matrix is a self-similarity matrix between embeddings of the audio content segments. The similarity matrix represents the similarity between different segments based on features extracted from the audio signals. A similarity matrix represents pairwise similarities between data points (audio content segments or embeddings). Various similarity measures include cosine similarity or Gaussian kernel similarity. A Laplacian matrix is derived from the similarity matrix that mathematically represents local structure. The eigenvalues and eigenvectors of the Laplacian matrix are computed, and certain eigenvectors are identified that correspond to the smallest non-zero eigenvalues for the Laplacian matrix. These certain eigenvectors are used to define the clusters of the audio content segments that best fit the structure of the data contained in the audio content segments. The data of the audio content segments includes data points for speaker attributes or other various parameters associated with differentiating unique speakers. Thus, the certain eigenvectors facilitate determining a best clustering fit for clustering the audio content segments by speaker attributes.

Once the number of speakers is selected, the system analyzes embeddings for the audio content using the selected number of speakers (Operation 260). The number of speakers identified by the speaker enumerator is used as contextual input for a second clustering analysis process. The second clustering analysis is performed using the first set of audio content segments comprised in the first set of audio content (as opposed to the pruned set of audio content segments) using the identified number resulting from the first clustering process (performed using the pruned set of audio content segments). One or more speakers are assigned to one or more audio content segments, respectively, of the first set of audio content segments. For example, one or more audio content segments of the first set of audio content segments is assigned a speaker according to the identified number of speakers provided by a speaker number estimation module. In this way, diarization is performed using spectral clustering on the original set of embeddings prior to pruning with the target number of speakers estimated using the pruned set of embeddings.

In various embodiments, the system labels one or more portions of audio content with speaker identifiers (Operation 270). The system labels the audio content and/or a transcript of the audio content. The system labels speech by providing a transcript of the audio content divided by speaker into discrete, continuous, non-overlapping portions corresponding to specific speakers. With the segmented audio and speaker diarization results, one or more segments of the transcript can be labeled with the corresponding speaker identifiers (of known or unknown speakers). This involves annotating the transcript with speaker IDs, such as Speaker A, Speaker B, etc., or alternatively, speakers can be labeled with specific names or identifiers if their identities are known to the system.

Once the transcript is accurately labeled with speaker identities and the number of speakers is determined, it can be further analyzed for various purposes, such as sentiment analysis, topic modeling, or extracting insights from the conversation, and/or one or more other actions can be performed.

4. EXAMPLE DIARIZATION USING EMBEDDING PRUNING

Figure 3A:
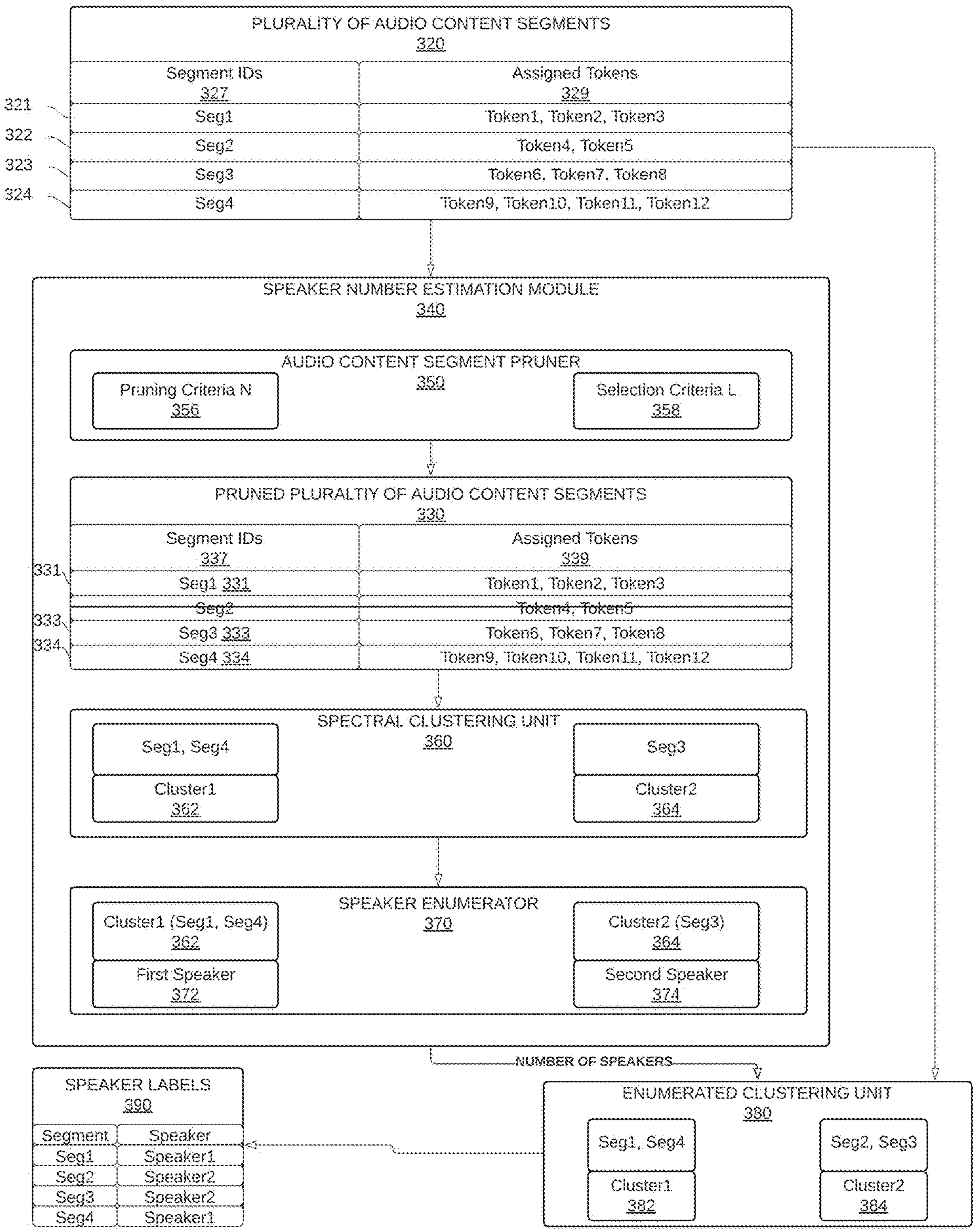
FIGS. 3A and 3B illustrate an example of diarization using embeddings pruning in accordance with one or more embodiments.
Figure 3B:
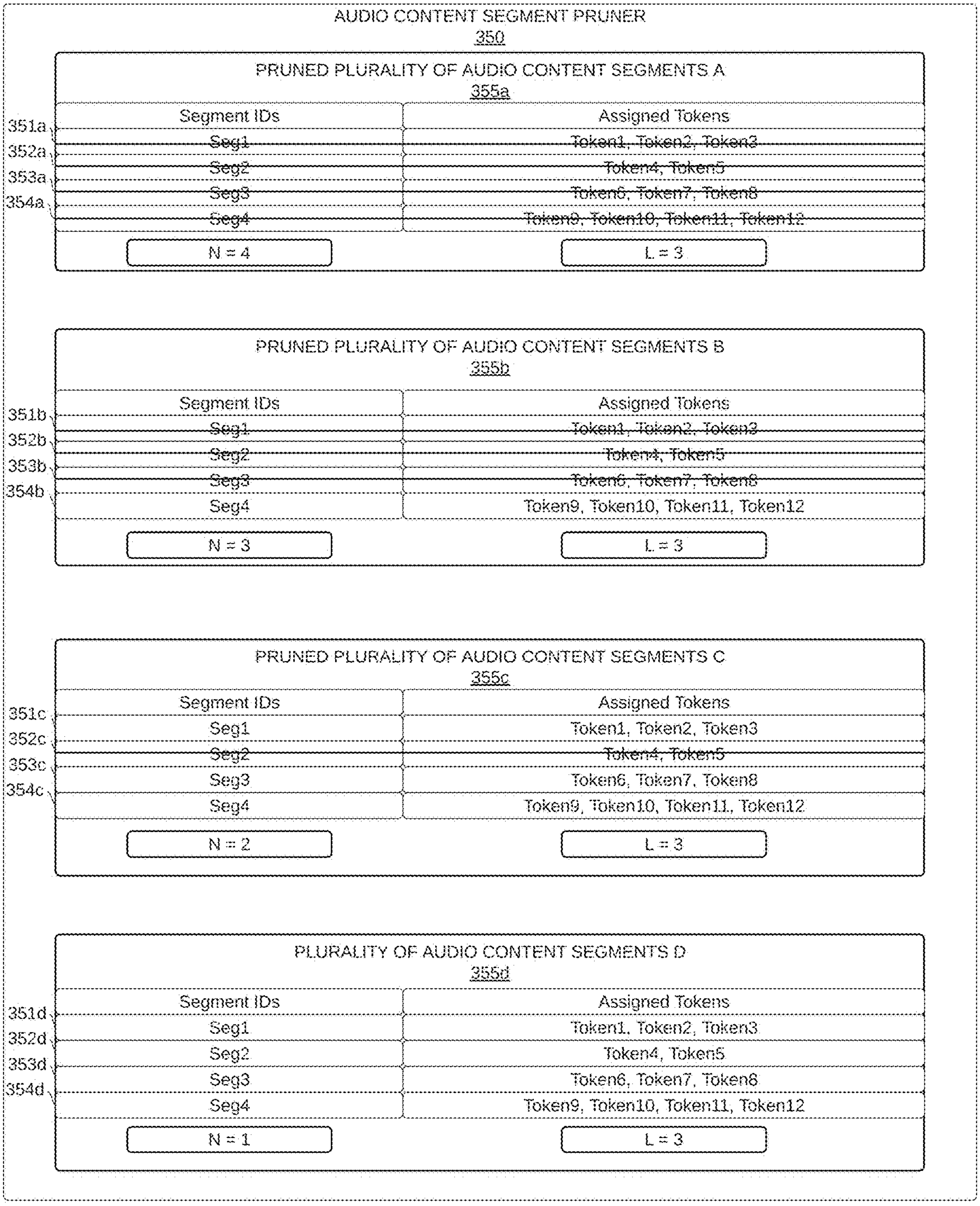
Figure 4:
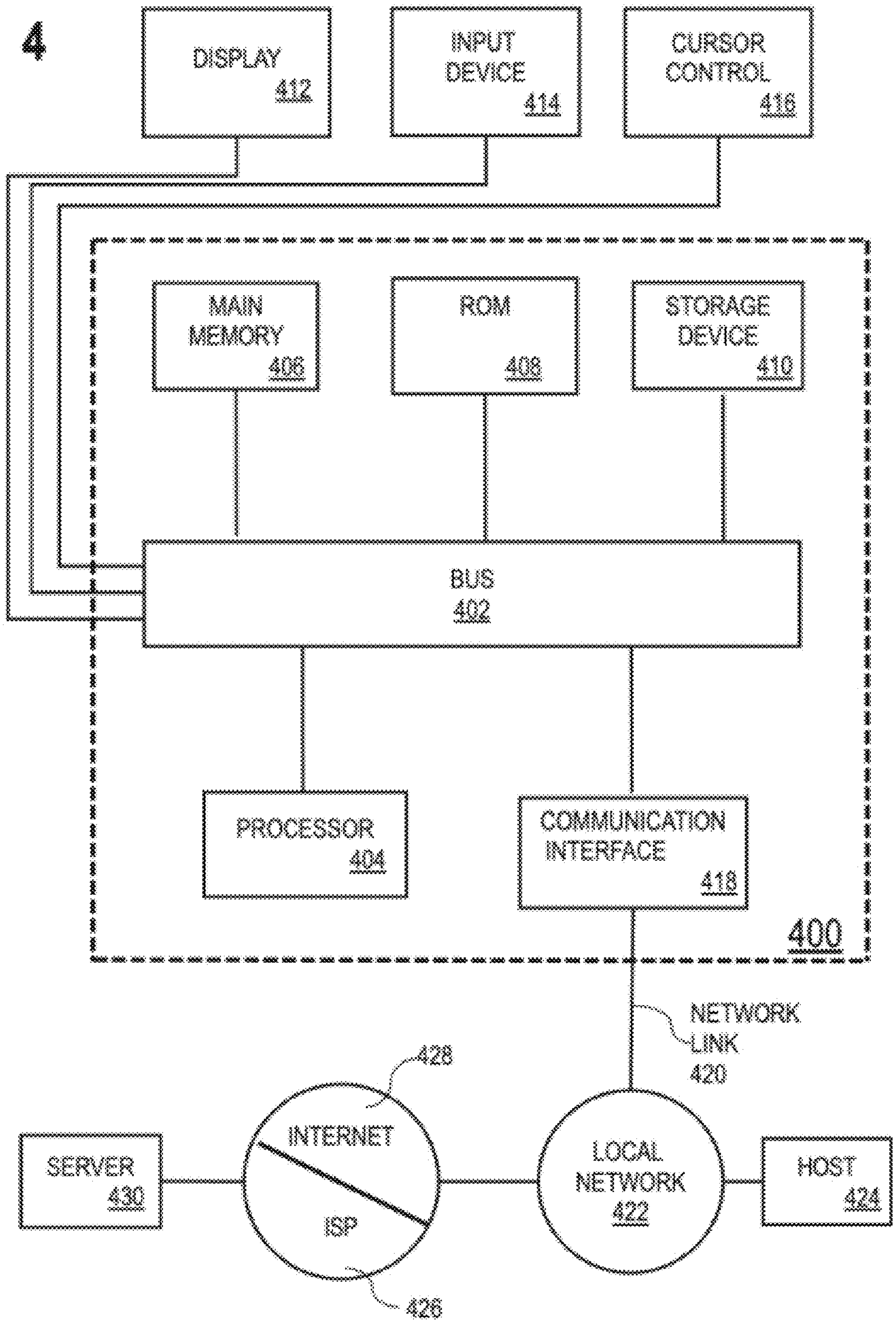
FIG. 4 shows a block diagram that illustrates a computer system in accordance with one or more embodiments.

FIGS. 3A and 3B illustrate an example of diarization using embedding pruning. FIG. 3A illustrates a set of audio content segments 320 being received by a speaker number estimation module 340. The speaker number estimation module 340 performs operations to determine an identified number of speakers for the input set of audio content segments that is based on a pruned set of audio content segments resulting from pruning the input set of audio content segments. The speaker number estimation module 340 provides the number of speakers to an enumerated clustering unit 380. The enumerated clustering unit 380 identifies speakers in the original input set of audio content segments (prior to pruning) using the number of speakers provided by the speaker number estimation module 340 to generate speaker labels 390.

The set of audio content segments includes raw audio content segments and/or audio content segment embeddings. In the example, the set of audio content segments 320 is illustrated as a matrix having a segment IDs column 327 and an assigned tokens column 329 for rows of the matrix. The audio content segments of the set of audio content segments 320 are illustrated as a first row 321 corresponding to a first segment, a second row 322 corresponding to a second segment, a third row 323 corresponding to a third segment, and a fourth row 324 corresponding to a fourth segment. The set of audio content segments 320 can include any number of rows with a row having a respective segment ID 327 and/or a respective array of tokens 329.

Different audio content segments (or embeddings of the segments) include different unique tokens. Segments may have zero tokens assigned, a few tokens assigned, or many tokens assigned. A token of an audio content segment of the set of audio content segments represents a contiguous portion of the audio content segment. In some cases, the contiguous portions of different tokens may overlap. A number of overlapped tokens can be used as pruning criteria. As used herein, an audio content segment may refer to an embedding of a segment of audio data and/or an array of tokens associated with a corresponding audio content segment identifier.

As illustrated, the set of audio content segments 320 includes a first row 321 identified as Seg1 that corresponds to a segment assigned Token1, Token2, and Token3; a second row 322 identified as Seg2 that corresponds to a segment assigned Token4 and Token5; a third row 323 identified as Seg3 that corresponds to a segment assigned Token6, Token7, and Token8; and a fourth row 324 identified as Seg4 that corresponds to a segment assigned Token9, Token10, Token11, and Token12.

The audio content segment pruner 350 performs pruning operations on the set of audio content segments 320 using at least one pruning criteria N 356 and/or at least one selection criteria L 358. As explained further below with reference to FIG. 3B, the pruning criteria N 356 is adjusted if the selection criteria L 354 is not met for the pruned set of audio content segments resulting from the pruning operations performed by the audio content segment pruner 350. For example, if a value for N results in criteria that are too strict, N is relaxed to prune less audio content segments until the audio content segment pruner 350 generates a pruned set of embeddings 325 that meets the selection criteria L 358.

The pruned set of embeddings 330 is received by the spectral clustering unit 360. In the example, the pruned set of embedding includes a row 331 corresponding to Seg1, a row 333 corresponding to Seg3, and a row 334 corresponding to Seg4. A row corresponding to Seg2 is not included in the pruned set of embeddings due to the pruning operations performed by the audio content segment pruner pruning row 322 for Seg2 (as illustrated in greater detail in FIG. 3B). A row corresponding to Seg2 is illustrated as stricken-out in FIG. 3A for illustrative purposes but is not included in the pruned set of audio content segments 330.

The spectral clustering unit 360 clusters Seg1 and Seg 4 into a first cluster 362. The spectral clustering unit 360 clusters Seg3 into a second cluster 364. Seg2 is not clustered due to not being present in the pruned set of audio content segments 330.

Using the clusters identified by the spectral clustering unit 360, the speaker enumerator 370 enumerates, numbers, or otherwise identifies the number of speakers based on the number of clusters. The spectral clustering determines the number of clusters as a part of the clustering process. The speaker enumerator 370 can identify the number of speakers and/or associate the clusters and/or particular segments with a particular speaker. The enumerator need not name or label the speakers explicitly but may merely provide an association of a segment or cluster to a particular speaker. For example, the speaker enumerator enumerates Cluster1 362 as belonging to a first speaker and enumerates Cluster2 as belonging to a second speaker.

The speaker number estimation module 340 provides the number of speakers identified by the speaker enumerator 370 to an enumerated clustering unit 380. The enumerated clustering unit 380 performs enumerated clustering using a number of clusters equal to the number of speakers identified by the speaker enumerator 370 (as opposed determining a number of speakers to as a part of the enumerated clustering process). The enumerated clustering unit 380 performs clustering using the set of embeddings 320 as opposed to the pruned set of embeddings 325 used to determine the number identified by the speaker enumerator 270.

In FIG. 3A, the enumerated clustering unit 380 clusters the set of embeddings 320 into Cluster1 382 and Cluster2 384. As shown, cluster1 382 includes the Seg1 and Seg4. Cluster2 includes the Seg2 and Seg3.

The enumerated clustering unit 380 generates speaker labels 390. The speaker labels 390 include a row for the audio content segment of the set of embeddings 320 and a label identifying the name of the speaker or an identifier of known or unknown speakers. In the example, the Seg1 and Seg4 are labeled with Speaker1, and the Seg3 and Seg4 are labeled with Speaker 2. Seg2 is labeled with Speaker 2 even though the corresponding row was not included in the pruned set of audio content segments due to having too few tokens in the segment (as explained in detail with reference to FIG. 3B). In other embodiments, the second segment may have been excluded from the pruned set of audio content segments due to having too high a percentage of silence, too high a percentage of overlapped speech, or based on some other pruning criteria or combination of pruning criteria.

FIG. 3B illustrates pruning operations using pruning criteria N 356 and selection criteria L 358. The pruning operations illustrated by FIG. 3B are based on a number of tokens for audio content segments. However, other pruning criteria N 356, or a combination of pruning criteria N 356, are used in various embodiments. For example, a percentage of silence pruning criteria N=50% may be used to prune audio content segments having 50% or more silence. Pruning criteria 356 in embodiments are further tailored to exclude target audio content segment types known to cause diarization errors.

In FIG. 3B, the set of audio content segments has been received by the audio content segment pruner 350. The audio content segment pruner 350 performs pruning operations using a selection criterion L=3. This value for the selection criterion L 358 is selected for illustrative purposes and may be much higher (or lower) in practice. The audio content segment pruner 350 performs pruning operations using minimum token threshold pruning criteria N=1, N=2, N=3, and N=4. These values for the pruning criteria N 356 are selected for illustrative purposes and may be much higher (or lower) in practice. The pruning criteria N 356 can also be qualitative rather than a numerical value.

The audio content segment pruner 350 prunes the set of audio content segments 320 using N=4 and L=3 as illustrated by pruned set of audio content segments A 355*a*. As shown, row 351*a* for Seg1 is pruned because there are only three (3) tokens assigned to Seg1, and 3≤N. Row 352*a* for Seg2 is pruned because there are only two (2) tokens assigned to Seg2, and 2≤N. Row 353A for Seg3 is pruned because there are only three (3) tokens assigned to Seg3, and 3≤N. Row 354*a* for Seg4 is pruned because there are only four (4) tokens assigned to Seg4, and 4≤N.

The resulting number of audio content segments in the pruned set of audio content segments A 355*a* is equal to zero (0), less than the selection criteria L=3. The pruning criteria N 356 is relaxed in a direction that may allow more audio content segments to be retained because it does not meet the selection criteria L 358. The audio content segment pruner 350 decrements (or decreases) the minimum token threshold N=4 and performs pruning operations on the set of audio content segments 320 using the decremented value for N as the updated minimum token threshold.

The audio content segment pruner 350 prunes the set of audio content segments 320 using updated minimum token threshold pruning criteria N=3 and selection criteria L=3 as illustrated by pruned set of audio content segments B 355*b*. As shown, row 351*b* for Seg1 is pruned because there are only three (3) tokens assigned to Seg1, and 3≤N. Row 352*b* for Seg2 is pruned because there are only two (2) tokens assigned to Seg2, and 2≤N. Row 353B for Seg3 is pruned because there are only three (3) tokens assigned to Seg3, and 3≤N. Row 354*b* for Seg4 is included in the pruned subset of audio content segments 355*b* because there are four (4) tokens assigned to Seg4, and 4>N.

The resulting number of audio content segments in the pruned set of audio content segments B 355*b* is equal to one (1), less than the selection criteria L=3. The pruning criteria N 356 is relaxed in a direction that may allow more audio content segments to be retained because it does not meet the selection criteria L 358. The audio content segment pruner 350 decrements (or decreases) N and performs pruning operations on the set of audio content segments 320 using the decremented value for N.

The audio content segment pruner 350 prunes the set of audio content segments 320 using N=2 and L=3 as illustrated by pruned set of audio content segments C 355*c*. As shown, row 351*c* for Seg1 is not pruned because there are three (3) tokens assigned to Seg1, and 3>N. Row 352*c* for Seg2 is pruned because there are only two (2) tokens assigned to Seg2, and 2≤N. Row 353*c* for Seg3 is not pruned because there are three (3) tokens assigned to Seg3, and 3>N. Row 354*d* for Seg4 is not pruned because there are four (4) tokens assigned to Seg4, and 4>N.

The resulting number of audio content segments in the pruned set of audio content segments C 355*c* is equal to three (3), greater than or equal to the selection criteria L=3. Because of meeting the selection criteria L 358, the pruned set of audio content segments C 355*c* is provided to the spectral clustering unit 360 (as shown in FIG. 3A).

In another example, the audio content segment pruner 350 prunes the set of audio content segments 320 using N=1 and L=3 as illustrated by pruned set of audio content segments D 355*d*. As shown, row 351*d* for Seg1 is not pruned because there are three (3) tokens assigned to Seg1, and 3>N. Row 352*d* for Seg2 is not pruned because there are two (2) tokens assigned to Seg2, and 2>N. Row 353*c* for Seg3 is not pruned because there are three (3) tokens assigned to Seg3, and 3>N. Row 354*d* for Seg4 is not pruned because there are four (4) tokens assigned to Seg4, and 4>N.

In this case, the resulting number of audio content segments in the pruned set of audio content segments D 355*d* is equal to four (4), greater than or equal to the selection criteria L=3. However, the resulting number of audio content segments in the pruned set of audio content segments D 355*d* is equal to the number of audio content segments in the input set of audio content segments 320. Due to no audio content segments being pruned, the pruning criteria N 356 is tightened in a direction that may cause more audio content segments to be pruned. The audio content segment pruner 350 increments (or increases) N and performs pruning operations on the set of audio content segments 320 using the incremented value for N. In some cases, a selection criteria L 358 is a range of values indicating a minimum and maximum number of audio content segments required for a pruned set of audio content segments to be provided to the spectral clustering unit 360.

In FIGS. 3A and 3B, the pruned set of audio content segments C 355*c* of FIG. 3B is used as the pruned set of audio content segments 330 of FIG. 3A that is provided to spectral clustering unit 360. In the example, the spectral clustering unit provides two clusters to the speaker enumeration 370 that identifies two (2) as the number of speakers for the enumerated clustering unit 380. Speaker labels 390 are then generated using this number. The speaker labels are used for transcription of the source audio of the audio content segments, such as by labeling one or more audio content segments with corresponding speaker identifiers.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the disclosure may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or a Solid State Drive (SSD) is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions that, when executed by one or more hardware processors, cause performance of operations comprising:

accessing a plurality of audio content segments comprised in a first set of audio content, each of the segments comprising intelligible speech;

determining a number of speakers based on pruned content comprising a pruned plurality of audio content segments at least by:

pruning the plurality of audio content segments based on one or more pruning criteria to determine a pruned plurality of audio content segments; and analyzing the pruned plurality of audio content segments to select a number of speakers for labeling the first set of audio content; and labeling portions of the first set of audio content, that is different from the pruned content, based on the number of speakers that was determined based on the pruned content at least by:

based at least on the selected number of speakers, that was determined based on the pruned content, for labeling the first set of audio content, analyzing one or more embeddings computed for the plurality of audio content segments:

based on the analyzing of the one or more embeddings, determining corresponding speaker identifiers for respective portions of the first set of audio content; and labeling the portions of the first set of audio content with the corresponding speaker identifiers.

2. The media of claim 1, wherein pruning the plurality of audio content segments based on the one or more pruning criteria to determine the pruned plurality of audio content segments comprises:

determining a subset of the plurality of audio content segments having a corresponding number of tokens that does not meet a minimum token threshold, wherein a token of an audio content segment of the plurality of audio content segments represents a contiguous portion of the audio content segment; and pruning the subset of the plurality of audio content segments from the plurality of audio content segments to determine the pruned plurality of audio content segments.

3. The media of claim 2, wherein the operations further comprise:

determining the number of tokens in the audio content segment at least by:

partitioning the audio content segment into a plurality of portions; and assigning each portion of the plurality of portions to a corresponding token.

4. The media of claim 1, wherein the operations further comprise:

accessing a second plurality of audio content segments comprised in a second set of audio content;

pruning the second plurality of audio content segments, to remove any audio content segments that do not meet a specified condition, to generate a second pruned plurality of audio content segments;

determining that a number of the second pruned plurality of audio content segments is below a threshold number of segments;

in response to determining that the number of the second pruned plurality of audio content segments is below a threshold number of segments:

adjusting the specified condition for the pruning criteria to generate an updated condition;

pruning the second plurality of audio content segments, to remove any audio content segments that do not meet the updated condition, to generate a third pruned plurality of audio content segments;

determining that a number of the third pruned plurality of audio content segments is not below a threshold number of segments;

analyzing the third pruned plurality of audio content segments to select a second number of speakers for labeling the second set of audio content; and based at least on the second number of speakers, analyzing one or more embeddings computed for the second set of audio content to label portions of the second set of audio content with corresponding speaker identifiers.

5. The media of claim 1, wherein pruning the plurality of audio content segments based on the one or more pruning criteria comprises:

determining a ratio of speech to silence in a particular audio content segment of the plurality of audio content segments; and in response to the ratio of speech to silence not meeting one or more conditions, pruning the particular audio content segment from the plurality of audio content segments.

6. The media of claim 1, wherein pruning the plurality of audio content segments based on the one or more pruning criteria comprises:

determining a confidence score from an ASR module for a particular audio content segment of the plurality of audio content segments; and in response to the confidence score not meeting one or more conditions, pruning the particular audio content segment from the plurality of audio content segments.

7. The media of claim 1, wherein pruning the plurality of audio content segments based on the one or more pruning criteria comprises:

determining a ratio of overlapped speech to total speech in a particular audio content segment of the plurality of audio content segments; and in response to the ratio of overlapped speech to total speech not meeting one or more conditions, pruning the particular audio content segment from the plurality of audio content segments.

8. The media of claim 1, wherein pruning the plurality of audio content segments based on the one or more pruning criteria comprises:

determining a language model lexical correlation value corresponding to a set of tokens associated with a particular audio content segment of the plurality of audio content segments; and in response to the language model lexical correlation value not meeting one or more conditions, pruning the particular audio content segment from the plurality of audio content segments.

9. The media of claim 1, wherein pruning the plurality of audio content segments based on the one or more pruning criteria comprises:

determining that an audio content segment is a member of a minority cluster or has a low neighbor density; and in response to the particular audio content segment being a member of the minority cluster or having the low neighbor density, pruning the particular audio content segment from the plurality of audio content segments.

10. A method of analyzing embeddings, comprising:

accessing a plurality of audio content segments comprised in a first set of audio content, each of the segments comprising intelligible speech;

determining a number of speakers based on pruned content comprising a pruned plurality of audio content segments at least by:

pruning the plurality of audio content segments based on one or more pruning criteria to determine a pruned plurality of audio content segments; and analyzing the pruned plurality of audio content segments to select a number of speakers for labeling the first set of audio content; and labeling portions of the first set of audio content, that is different from the pruned content, based on the number of speakers that was determined based on the pruned content at least by:

based at least on the selected number of speakers, that was determined based on the pruned content, for labeling the first set of audio content, analyzing one or more embeddings computed for the plurality of audio content segments:

based on the analyzing of the one or more embeddings, determining corresponding speaker identifiers for respective portions of the first set of audio content; and labeling the portions of the first set of audio content with the corresponding speaker identifiers.

11. The method of claim 10, wherein pruning the plurality of audio content segments based on the one or more pruning criteria to determine the pruned plurality of audio content segments comprises:

determining a subset of the plurality of audio content segments having a corresponding number of tokens that does not meet a minimum token threshold, wherein a token of an audio content segment of the plurality of audio content segments represents a contiguous portion of the audio content segment; and pruning the subset of the plurality of audio content segments from the plurality of audio content segments to determine the pruned plurality of audio content segments.

12. The method of claim 11, further comprising:

determining the number of tokens in the audio content segment at least by:

partitioning the audio content segment into a plurality of portions; and assigning each portion of the plurality of portions to a corresponding token.

13. The method of claim 10, further comprising:

accessing a second plurality of audio content segments comprised in a second set of audio content;

pruning the second plurality of audio content segments, to remove any audio content segments that do not meet a specified condition, to generate a second pruned plurality of audio content segments;

determining that a number of the second pruned plurality of audio content segments is below a threshold number of segments;

in response to determining that the number of the second pruned plurality of audio content segments is below a threshold number of segments:

adjusting the specified condition for the pruning criteria to generate an updated condition;

pruning the second plurality of audio content segments, to remove any audio content segments that do not meet the updated condition, to generate a third pruned plurality of audio content segments;

determining that a number of the third pruned plurality of audio content segments is not below a threshold number of segments;

analyzing the third pruned plurality of audio content segments to select a second number of speakers for labeling the second set of audio content; and based at least on the second number of speakers, analyzing one or more embeddings computed for the second set of audio content to label portions of the second set of audio content with corresponding speaker identifiers.

14. The method of claim 10, wherein pruning the plurality of audio content segments based on the one or more pruning criteria comprises:

determining a ratio of speech to silence in a particular audio content segment of the plurality of audio content segments; and in response to the ratio of speech to silence not meeting one or more conditions, pruning the particular audio content segment from the plurality of audio content segments.

15. The method of claim 10, wherein pruning the plurality of audio content segments based on the one or more pruning criteria comprises:

determining a confidence score from an ASR module for a particular audio content segment of the plurality of audio content segments; and in response to the confidence score not meeting one or more conditions, pruning the particular audio content segment from the plurality of audio content segments.

16. The method of claim 10, wherein pruning the plurality of audio content segments based on the one or more pruning criteria comprises:

determining a ratio of overlapped speech to total speech in a particular audio content segment of the plurality of audio content segments; and in response to the ratio of overlapped speech to total speech not meeting one or more conditions, pruning the particular audio content segment from the plurality of audio content segments.

17. The method of claim 10, wherein pruning the plurality of audio content segments based on the one or more pruning criteria comprises:

determining a language model lexical correlation value corresponding to a set of tokens associated with a particular audio content segment of the plurality of audio content segments; and in response to the language model lexical correlation value not meeting one or more conditions, pruning the particular audio content segment from the plurality of audio content segments.

18. The method of claim 10, wherein pruning the plurality of audio content segments based on the one or more pruning criteria comprises:

determining that a particular audio content segment is a member of a minority cluster or has a low neighbor density; and in response to the particular audio content segment being a member of the minority cluster or having the low neighbor density, pruning the particular audio content segment from the plurality of audio content segments.

19. A system comprising:

at least one device including a hardware processor;

the system being configured to perform operations comprising:

accessing a plurality of audio content segments comprised in a first set of audio content, each of the segments comprising intelligible speech;

determining a number of speakers based on pruned content comprising a pruned plurality of audio content segments at least by:

pruning the plurality of audio content segments based on one or more pruning criteria to determine a pruned plurality of audio content segments; and analyzing the pruned plurality of audio content segments to select a number of speakers for labeling the first set of audio content; and labeling portions of the first set of audio content, that is different from the pruned content, based on the number of speakers that was determined based on the pruned content at least by:

based at least on the selected number of speakers, that was determined based on the pruned content, for labeling the first set of audio content, analyzing one or more embeddings computed for the plurality of audio content segments:

based on the analyzing of the one or more embeddings, determining corresponding speaker identifiers for respective portions of the first set of audio content; and labeling the portions of the first set of audio content with the corresponding speaker identifiers.

20. The system of claim 19, wherein pruning the plurality of audio content segments based on the one or more pruning criteria comprises:

determining a ratio of speech to silence in a first audio content segment of the plurality of audio content segments;

in response to the ratio of speech to silence not meeting one or more specified conditions, pruning the first audio content segment from the plurality of audio content segments;

determining a confidence score from an ASR module for a second audio content segment of the plurality of audio content segments;

in response to the confidence score not meeting the one or more specified conditions, pruning the second audio content segment from the plurality of audio content segments;

determining a ratio of overlapped speech to total speech in a third audio content segment of the plurality of audio content segments;

in response to the ratio of overlapped speech to total speech not meeting the one or more specified conditions, pruning the third audio content segment from the plurality of audio content segments;

determining a language model lexical correlation value corresponding to a set of tokens associated with a fourth audio content segment of the plurality of audio content segments;

in response to the language model lexical correlation value not meeting the one or more specified conditions, pruning the fourth audio content segment from the plurality of audio content segments;

determining that a fifth audio content segment is a member of a minority cluster or has a low neighbor density;

in response to the fifth audio content segment being a member of the minority cluster or having the low neighbor density, pruning the fifth audio content segment from the plurality of audio content segments;

accessing a second plurality of audio content segments comprised in a second set of audio content;

pruning the second plurality of audio content segments, to remove any audio content segments that do not meet a specified condition, to generate a second pruned plurality of audio content segments;

determining that a number of audio content segments in the second pruned plurality of audio content segments is below a threshold number of segments;

in response to determining that the number of audio content segments in the second pruned plurality of audio content segments is below a threshold number of segments:

adjusting the specified condition for the pruning criteria to generate an updated condition;

pruning the second plurality of audio content segments, to remove any audio content segments that do not meet the updated condition, to generate a third pruned plurality of audio content segments;

determining that a number of the third pruned plurality of audio content segments is not below a threshold number of segments;

analyzing the third pruned plurality of audio content segments to select a second number of speakers for labeling the second set of audio content; and based at least on the second number of speakers, analyzing one or more embeddings computed for the second set of audio content to label portions of the second set of audio content with corresponding speaker identifiers.

* * * * *